March 6, 1934.  T. DUGAN  1,949,787
AIRPLANE
Filed Jan. 30, 1932
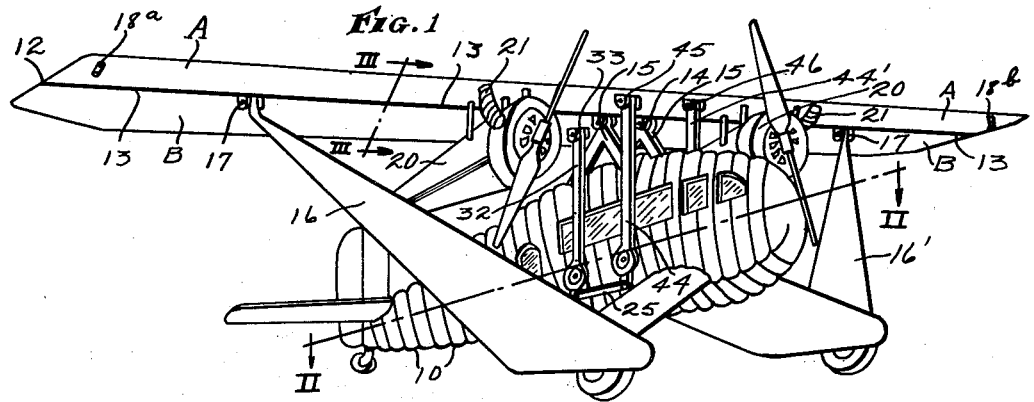
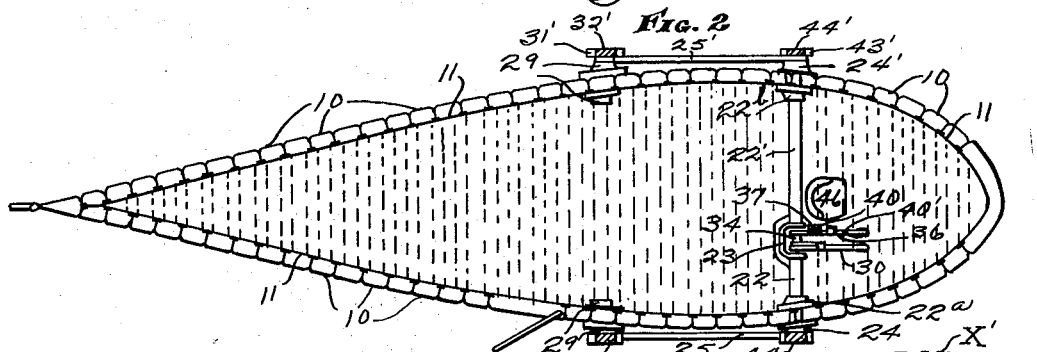
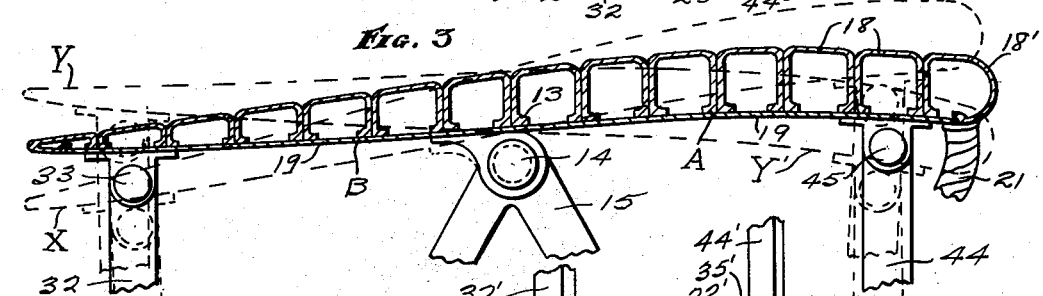
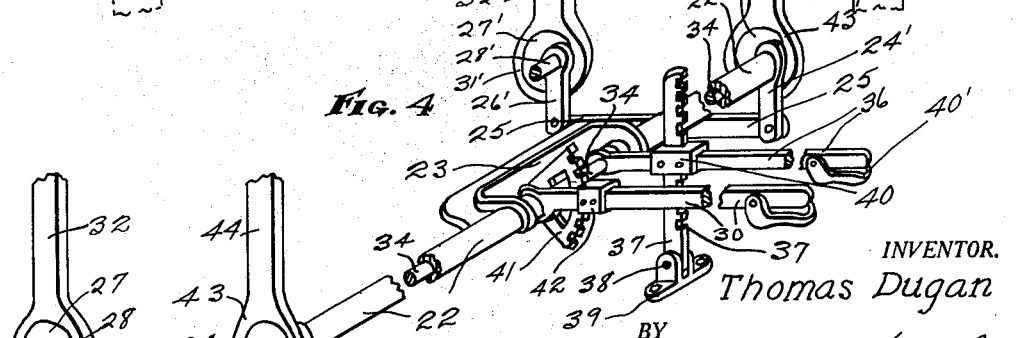
INVENTOR.
Thomas Dugan
BY
M. Y. Charles
ATTORNEY.

Patented Mar. 6, 1934

1,949,787

UNITED STATES PATENT OFFICE 1,949,787

AIRPLANE

Thomas Dugan, Wichita, Kans., assignor of one-half to Robt. Benj. Davis, Wichita, Kans.

Application January 30, 1932, Serial No. 589,785

6 Claims. (Cl. 244—12)

This invention relates to an improvement in airplanes. The object of this invention is to provide a fire proof airplane that is light, durable, strong and one which may be adjusted to meet varying flying conditions while flying in the air. Another object is to provide an airplane of the kind above described and in addition thereto, a portion of the wing acts as a muffler to receive the exhaust of the engines. Another object is to provide an airplane of the kind above described that will have a slow landing speed but the wings may be adjusted for high speed after the plane has left the ground. These and other objects will be more fully described and explained as this description progresses.

Referring to the drawing, Fig. 1 is a perspective view of my improved airplane. Fig. 2 is a sectional view through the body of my airplane as seen from the line II—II in Fig. 1. Fig. 3 is an enlarged detail sectional view through the wing as seen from the line III—III in Fig. 1. Fig. 4 is a perspective view of the mechanism employed in adjusting the wing of the plane.

In the drawing is shown an airplane having a body built up of channel like elements 10 placed against each other and rigidly fastened to each other by welding or any other suitable method after which a lining 11 is placed over the open side of the channels and rigidly fastened thereto by welding or any other suitable method which produces an airplane body made up of tube like portions rigidly fastened together to form the composite body which is light and possesses the maximum of strength and rigidity due to its construction above described. The construction provides an airplane body whose walls, floor and ceiling are composed of a multiplicity of hollow sections providing dead air spaces which make the body easier to heat and thereby make for more comfort in riding in cold weather.

At 12 is shown the wing which is made in two sections A and B which are hinged together along the line 13. The portion B of the wing 12 is hingedly attached at 14 to brackets 15 which are rigidly attached to the body of the airplane. At 16 and 16' are brace elements also pivotally attached at 17 and 17' to the wing element B. The wing elements A and B are made of a series of channel like elements 18 placed side by side and rigidly fastened to each other by welding or any other suitable means, after which a lining 19 is placed over the open sides of the channels and rigidly fastened thereto by welding or any other suitable means thereby producing a wing constructed of tube like elements running lengthways of the wing. These tube like formations may be used to carry gasoline and oil for the motor as well as to act as a muffler for the motors as will be mentioned in the following description. On the section A of the wing 12 are mounted the motors 20 and 20' and their exhaust pipes 21 and 21' empty into the first tube 18' of the wing element A, which acts as a muffler for the exhaust of the motors. At the extremities of the tubular element 18' are exhaust openings 18a and 18b through which the exhaust from the motors are finally discharged. The exhaust of the motors passing through the tube 18' cause the tube to become heated which, in cold weather, will prevent ice from forming on the wing, thereby avoiding accidents which frequently occur from this cause.

There are flying conditions such that it would be advantageous if the position or angle of the wing in relation to the body of the airplane could be changed. There are also times when it would be an advantage if the shape or curvature of the wing 12 could be changed. There are also times when it would be an advantage to change the angle or position of the motors with respect to the wing or the body of the airplane. These changes or adjustments can be made while the airplane is flying if desired by the use of the following described mechanism which is shown in Fig. 4 and is also a part of my improved airplane.

At 22 and 22' are shown tubular elements rigidly joined together by a yoke element 23, said tubular elements 22 and 22' being rotatably mounted in bearings 22a and 22b which are rigidly attached to the side walls of the body portion of the airplane and the outer ends of the tubular elements 22 and 22' extend through the walls of the body and on the outer ends of said tubular elements 22 and 22' are arms 24 and 24' rigidly attached to said tubular elements 22 and 22'. At 25 and 25' are links pivotally joined at one end to the lower end of the arms 24 and 24' and at the other end to the arms 26 and 26' which are rigid with the eccentrics 27 and 27' which are rigid with shafts 28 and 28', these shafts 28 and 28' are rotatably mounted in bearings 29 and 29' which are rigidly mounted on the walls of the body of the airplane. At 30 is a lever rigidly mounted on the inner end of the tubular element 22 and adapted to rotate the tubular elements 22 and 22' upon movement up or down of the lever 30 which in turn swings the arms 24 and 24' which, through the link connections 25 and 25', swing the arms 26 and 26' which revolve the eccentrics 27 and 27'. At 31 and 31' are shown eccentric yokes which are integral with connecting rods 32 and 32' the upper ends of which are pivotally connected as shown at 33 to the rear portion of the section B of the wing 12.

In the tubular elements 22 and 22' is a shaft 34 rotatably mounted on the ends thereof. At 36 is a lever rigidly mounted on the shaft 34 and adapted to rotate the shaft 34 upon the upward or downward movement of the lever 36. At 37 is a notched bar pivotally mounted at 38 in a mounting 39 which is rigidly attached to the floor of the airplane body. On the lever 36 is rigidly mounted a yoke element 40 through which the bar 37 passes and in which is a dog, not shown, that is adapted to engage the notches 37' and act as a lock to retain the lever 36 and eccentrics 35 and 35' in any desired position, it will be understood that the dog is caused to disengage the notches 37' by the squeezing of the band grips 30' against the end of the lever 36, there being a connecting rod, not shown, between the dog and the hand grip 40. This is a construction in common use therefore it is not necessary to show its details. Rigidly mounted on the shaft 34 is a notched segment 41 positioned beside the lever 30. Rigidly attached to the lever 30 is an element 42 in which is a dog, not shown, adapted to engage the notches in the notched segment 41, said dog being operated the same as the one described on the lever 36. This device serves to lock the shaft 34 to the tubular elements 22 and 22' so that upon the movement of the lever 36 the eccentrics 31, 35, 35' and 31' are rotated simultaneously. At 43 and 43' are eccentric yokes which are integral with the connecting rods 44 and 44' the upper ends of which are pivotally connected at 45 and 46 to the forward edge of the wing element A.

Assuming the normal position and curvature of the wing 12 is as shown in full lines in Fig. 3 but for slow landing it may be desired to set the wing in the position shown by the dotted lines X—X' or for other reasons it may be desirable to set the wing in the position Y—Y'. There may be conditions where it would be advantageous to change the curvature of the wing such as indicated by the dotted position X—Y'. All these positions are obtainable by the proper manipulation of the levers 30 and 36 as shown and illustrated. It will be noted that in the tilting the wing the motors are also tilted to aid in the effect desired by the pilot of the airplane who is seated on the seat 46.

It is understood that such modifications of my improved airplane may be employed as lie within the scope of the appended claims without departing from the spirit and intention of my invention. Now having fully described my invention, what I claim as new and desire to secure by Letters Patent is;

1. In an improved airplane, a body portion and a wing for the support of said body, said wing being split longitudinally and then hinged together, said wing being pivotally mounted on said body and means for tilting each section of the wing up or down independently of the other, and means for propelling the airplane all substantially as shown and for the purpose set forth.

2. In an improved airplane, a body portion and a wing portion, said wing portion being made in two longitudinal sections, said sections being hinged together and one of said sections being pivotally mounted on the body portion of the airplane, means for tilting the wing sections simultaneously or independent of each other up or down so that the angle of the wing with respect to the body may be changed at will or the curvature of the wing may be changed at will, motors mounted on the front section of the wing for the propulsion of the airplane.

3. In an improved airplane, said airplane having a body portion and a wing portion, said wing portion being made in two longitudinal sections and hinged together to form the composite wing, said wing being pivotally mounted on the airplane body portion adjacent the hinge connection of said wing sections, connecting rods connected to the outer edges of said wing sections and to eccentrics positioned on the walls of the airplane body, and means for operating said eccentrics so they will tilt the sections of the wing to such angle or curvatures as desired by the pilot of the airplane and motors on said airplane for the propulsion thereof substantially as shown and described.

4. In an improved airplane, an airplane body, a wing element for the support of said body in the air, said wing element being composed of two longitudinal sections, said sections being hinged together to form the composite wing element, said wing element being pivotally mounted on said airplane body on hangers, said hangers being connected to one of the wing sections, a mechanism for tilting the sections of said wing, said mechanism comprising a pair of tubular elements spaced apart and in axial alignment with each other and being rigidly connected together by a yoke like element, said tubular elements being mounted in bearings on the walls of the airplane body, an actuating arm on the outer end of each said tubular element and connecting links joined at one end to the said actuating arm on the tubular elements, the other end of said connecting links being pivotally connected to a second arm which is rigid with an eccentric pivotally mounted on the sides of the airplane body, connecting rods, one end of said connecting rods being connected to the eccentrics on either side of the airplane body and the other end of said connecting rods being pivotally connected to the trailing or rear edge of the rear section of the wing element, a shaft, said shaft being rotatably mounted in said tubular elements, eccentrics rigidly mounted on the outer ends of said shaft, a second pair of connecting rods, one end of which is connected to the eccentrics on said shaft, the other end of said second pair of connecting rods being pivotally connected to the entering or front edge of the forward section of wing element, an operating lever rigidly mounted on said shaft and means for holding said lever in any set position, and means on said airplane for propelling it through the air all substantially as shown and for the purposes set forth and described.

5. In an improved airplane, said airplane having a body portion, said body portion being composed of a series of channel like elements whose flanges are welded together to form a continuous external portion of said body portion, a lining in said body portion, said lining being welded to the flanges of said channel like elements to form a reinforced body portion as shown and described.

6. In an improved airplane, said airplane having a body portion and a wing portion for the support of said body portion, said wing portion being composed of a series of channel like members whose flanges are welded together, said channel like members varying in proportion so that their backs will form the shape of the upper side of said wing portions, a lining on the under side of said channel like members, said lining being welded to the flanges of said channel like elements to form the composite reinforced wing portion for said airplane as shown and described.

THOMAS DUGAN.